United States Patent [19]

Gellner

[11] Patent Number: 5,182,964
[45] Date of Patent: Feb. 2, 1993

[54] CHANGE-SPEED GEARBOX HAND LEVER CONNECTING DEVICE

[75] Inventor: Harald Gellner, Marbach, Fed. Rep. of Germany

[73] Assignee: Mercedes-Benz AG, Fed. Rep. of Germany

[21] Appl. No.: 647,506

[22] Filed: Jan. 29, 1991

[30] Foreign Application Priority Data

Feb. 9, 1990 [DE] Fed. Rep. of Germany ....... 4003899

[51] Int. Cl.⁵ .......................... G05G 9/47; G05G 1/04
[52] U.S. Cl. .................... 74/523; 74/473 P; 74/471 XY; 74/524; 74/525
[58] Field of Search ............. 74/741 XY, 524, 525, 74/523, 527, 557, 473 P

[56] References Cited

U.S. PATENT DOCUMENTS

| | | | |
|---|---|---|---|
| 1,156,272 | 10/1915 | Cass | 74/523 |
| 1,908,423 | 5/1933 | Hjermstad | 74/523 |
| 3,308,675 | 3/1967 | Jonsson | 74/523 X |
| 3,561,281 | 2/1971 | Wilfert | 74/523 X |
| 3,591,192 | 7/1971 | Sharp et al. | 74/523 |
| 3,657,943 | 4/1972 | Brahn, Jr. et al. | 74/524 |
| 3,732,746 | 5/1973 | Fitzpatrick | 74/523 X |
| 3,918,316 | 11/1975 | Reinhold et al. | 74/523 X |
| 4,565,107 | 1/1986 | Müller | 74/473 P |
| 4,765,023 | 8/1988 | Ganter | 74/557 X |
| 4,849,583 | 7/1989 | Meyer | 74/471 XY |
| 4,862,760 | 9/1989 | Kuwahara et al. | 74/473 P |
| 4,873,884 | 10/1989 | Yamada et al. | 74/523 X |
| 4,916,966 | 4/1990 | Weishaupt et al. | 74/473 P |
| 4,981,047 | 1/1991 | Denda et al. | 74/525 X |

FOREIGN PATENT DOCUMENTS

| | | | |
|---|---|---|---|
| 0176682 | 4/1986 | European Pat. Off. | 74/523 |
| 2530358 | 1/1977 | Fed. Rep. of Germany | 74/523 |
| 2700239 | 7/1978 | Fed. Rep. of Germany | 74/523 |
| 3307950 | 9/1983 | Fed. Rep. of Germany | 74/523 |
| 0196363 | 11/1983 | Japan | 74/523 |

*Primary Examiner*—Vinh T. Luong
*Attorney, Agent, or Firm*—Evenson, Wands, Edwards, Lenahan & McKeown

[57] ABSTRACT

A hand lever of a selecting device of an automatically changing change-speed gearbox is inserted in a pre-assembled acceptance part which is connected via a joint to a setting linkage leading to a selection element. A predetermined installation position can be thus achieved with a positioning device.

19 Claims, 3 Drawing Sheets

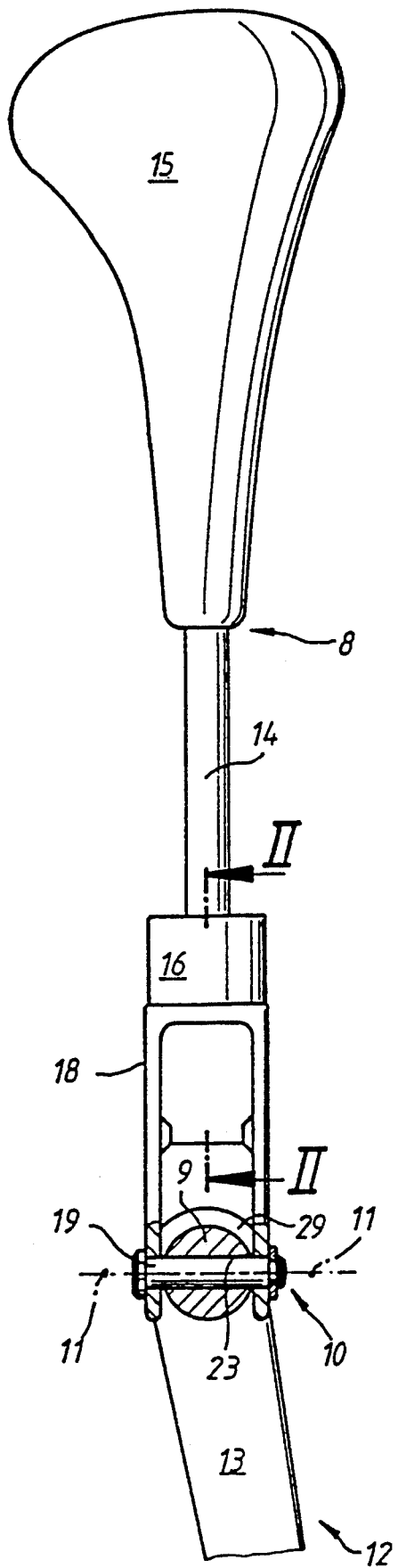

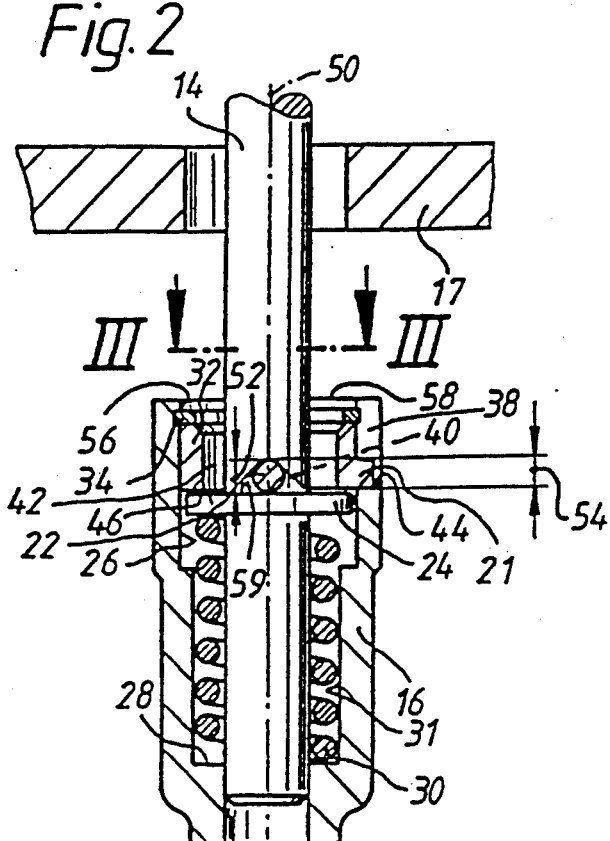
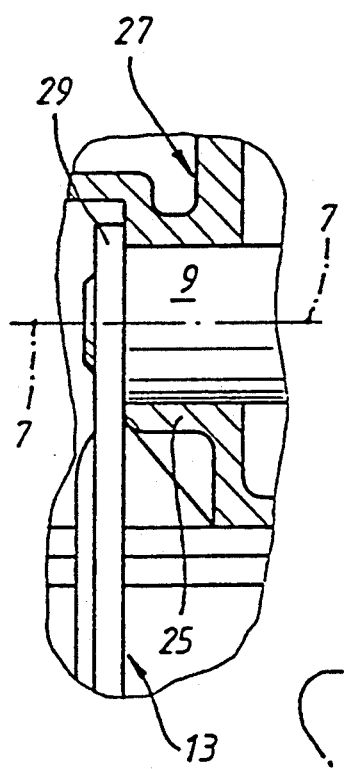
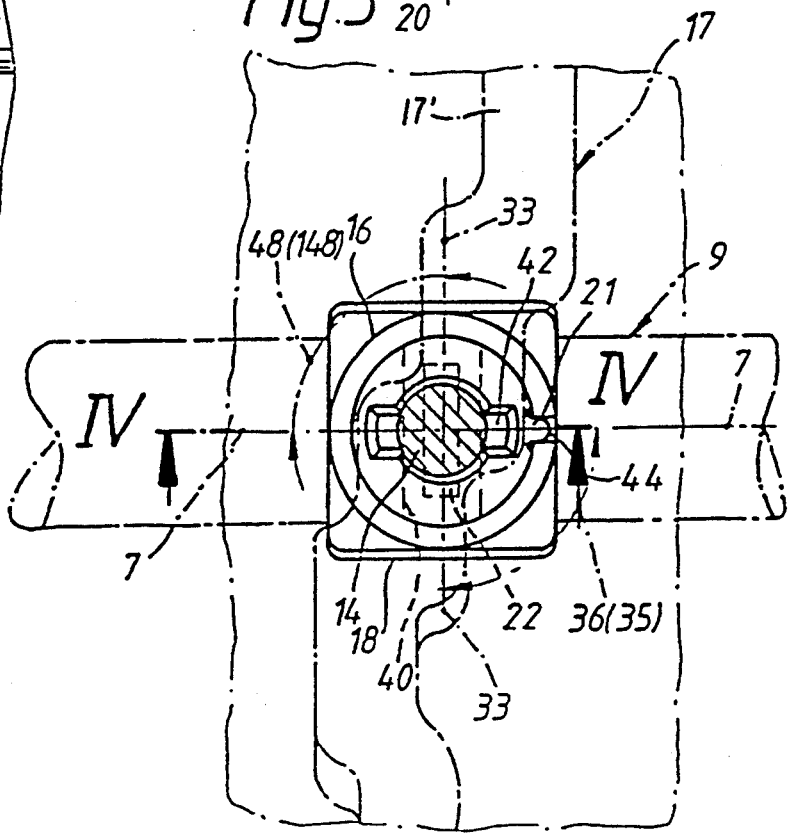

CHANGE-SPEED GEARBOX HAND LEVER CONNECTING DEVICE

BACKGROUND AND SUMMARY OF THE INVENTION

The present invention concerns a device for connecting a hand lever to a setting linkage for selecting gears of a change-speed gearbox and, more particularly, to a device which creates a releasable connection of the hand lever.

In a known hand lever connecting device shown in DE-PS-3,307,950, the setting linkage is additionally used for changing the gears by hand so that the sliding guide for the lower end of the lever part cannot move relative to the joint half connected to the setting linkage and the acceptance part cannot move relative to a gearbox casing part. Both the support for the lever part in the acceptance part and the joint between the setting linkage and the acceptance part are designed as spherical joints. An annular ball socket operating as a support and supported for damping purposes on a support spring is directly supported on the circlip in order to accept the spring force, and is also penetrated by two positioning trunnions which cannot move relative to it. The radially inward (i.e., relative to the bearing axis) ends of these positioning trunnions engage in a guide slot, parallel to the bearing axis, of the joint ball fixed relative to the lever, and the radially outward ends of these positioning trunnions engage in a corresponding guide slot of the acceptance part in each case. The annular ball socket operating as a holding-down device is pressed, as an elastic plastic part, into a corresponding cylindrical section of the lower ball socket and is fixed relative to the latter by a further circlip. With this arrangement, it is impossible to design the acceptance part with the ball socket for the subsequent insertion of the hand lever as a pre-assembled unit or to assemble or dismantle the hand lever by uncovering the acceptance part by a gate guide, especially since it is also not directly possible to bring the sliding guide, connected to the gear-change shaft, for accepting the lower joint ball of the hand lever into a position aligned with the axis of the acceptance part.

An object of the present invention consists essentially in providing a device for the releasable connection of a hand lever by a joint to a setting linkage for selecting gears in an automatic gear-selection device of a change-speed gearbox. The hand lever of such a device can be brought finally, i.e. after the installation in the vehicle of the setting linkage and the conventional selection gate, without great difficulty into its predetermined installation position relative to the position of the gear knob.

In the device according to the present invention, the acceptance part, together with the support spring, the two support rings and together with the single circlip which is still necessary, can be configured as a preassembled structural unit in which the hand lever can, after the fitting of the conventional selection gate has been completed, be inserted through the latter and be fixed directly in the predetermined installation position.

BRIEF DESCRIPTION OF THE DRAWINGS

These and further objects, features and advantages of the present invention will become more readily apparent from the following detailed description of presently preferred embodiments when taken in conjunctions with the accompanying drawings wherein:

FIG. 1 is an elevational view, partly in cross-sections, of one embodiment of a device according to the present invention;

FIG. 2 is a sectional view along line II—II, of FIG. 1;

FIG. 3 is a sectional view along line III—III of FIG. 2;

FIG. 4 is a sectional view along line IV—IV of FIG. 3;

DETAILED DESCRIPTION OF THE DRAWINGS

Figure 6:
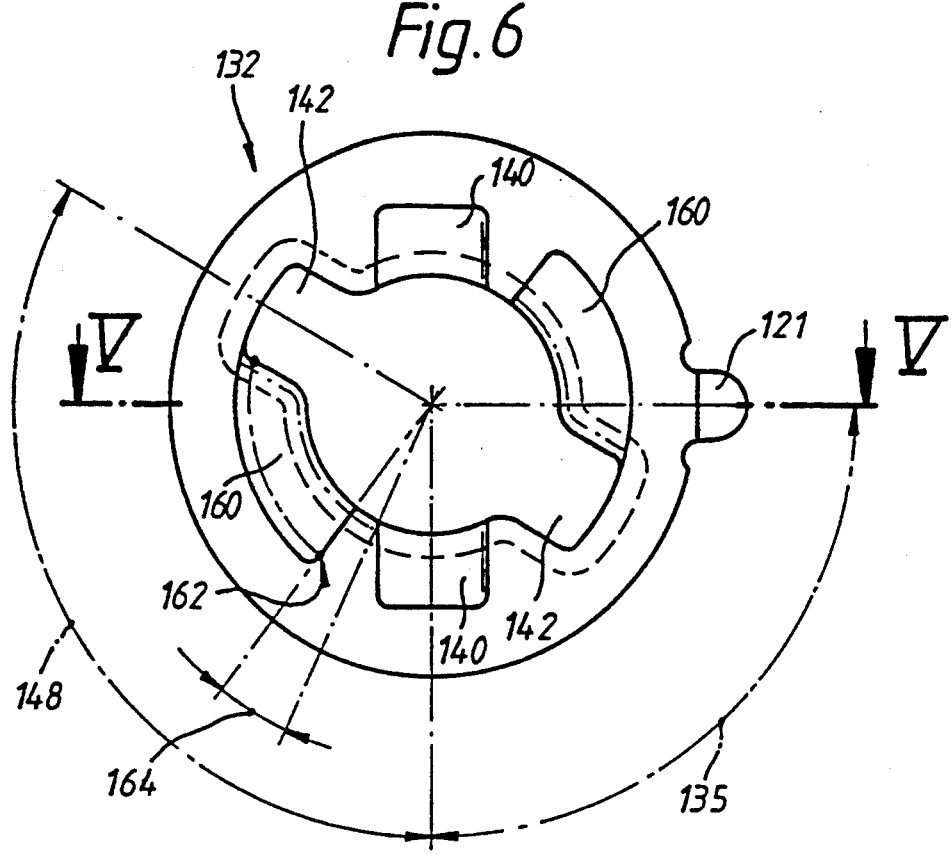
FIG. 6 is a top plan view of the bearing ring of FIG. 5 in a view along the arrow VI, i.e. in the direction pointing away from the abutment towards the end face.

A hand lever 8 of a selection device of an automatic gear-changing device of a change-speed gearbox is located near the driver's seat of a motor vehicle and is provided with the usual gear knob 15 at its upper end. The lever 8 is guided in its central region by a conventional selection gate (FIGS. 2 and 3) and is provided at its lower end with permanently connected lever part 14, which is releasably fastened in a cylindrical acceptance part 16 of a forkhead 18 forming one half of a single-axis joint 10. The other half of the joint is formed by a joint pin 19 which is held in a transverse bore 23 of a setting shaft 9 and is connected so that it cannot be rotated relative to but can be released from the setting shaft 9.

The forkhead 18, and hence also the hand lever 8, are pivotably linked at the joint pin 19 whose axis, i.e. joint axis 11—11, is located transverse to the rotational axis 7—7 of the setting shaft 9. In this way, the hand lever 8 can follow the changing shape of the gate sections 17' of the gate guide 17. The gate sections are offset relative to one another in the directions of the rotational axis 7—7 (FIG. 3).

The setting shaft 9, connected via the joint 10 to the hand lever 8 to prevent relative rotation therebetween, is rotationally supported in a bearing eye 25 of a bracket part 27 firmly fixed relative to the vehicle (FIG. 4). A setting lever 13 is also firmly connected by its fastening eye 29 to the setting shaft 9. The setting lever 13 forms one end of a setting linkage 12 which leads to a selection element of the change-speed gearbox.

The sleeve-shaped acceptance part 16 has, at its lower end, a narrow cylindrical guide section 20 as a sliding guide for the lower end of the lever part 14, a central section 31 of which follows on from the guide section 20 and which is somewhat increased in diameter to accept a support spring 30, and an upper guide section 26 following on from the central section 31 and once more increased in diameter for two support rings 24 and 32. The support rings are movably penetrated by the lever part 14.

The radial shoulder formed between the sections 20 and 31 of the acceptance part 16 constitutes an abutment 28 for the support spring 30 on which is supported the support ring 24 operating as support for the lever part 14. The other support ring 32 operates as a holding-down device for the lever part 14. For this purpose, the support ring 32 is supported under the action of the pre-loaded support spring 30 on a circlip 34 inserted as a releasable stop in an internal peripheral groove of the guide section 26.

By way of a radial lug located on its external surface and used as a first positioning element 21, the support ring 32 engages in an axial slot 44 in the guide section 26 used as a corresponding first catch 38 in order to fix the support ring 32 in a definite angular position relative to the acceptance part 16. The slot is open in the direction of the bearing axis 50—50 pointing in the direction of the end face 58 which has the assembly opening 56 for the insertion of the bearing rings, etc., but which is closed in the direction of the bearing axis 50—50 pointing in the direction of the abutment 28, so that the bottom of the slot 44 forms, in this latter direction, a stop for the support ring 32 and for its positioning element 21.

The lever part 14 interacts with the two support rings 24 and 32 via two trunnion-shaped support parts 22 located in alignment with a common axis 33—33 and fixed so that they cannot rotate or move diametrally relative to the lever part 14. The support parts 22 contact, on one hand, the end face 59 of the support ring 24, adjacent to the support ring 32. On the other hand, each of the support parts 22 engage in an associated second catch 40 formed in the end face 46 of the support ring 32, adjacent to the support ring 24 and being in alignment with the axis 33—33 in the installed position. So that the spring force of the support spring 30 is not eliminated by the support ring 32, the diameter 52 of each of the support parts 22 is greater than the effective depth 54, relative to the end face 46, of the associated catch 40 so that the spring force acts on the lever part 14 via the support parts 22.

Each of the support parts 22 is used as a second positioning element in order to bring the gear knob 15, via the support ring 32, into a predetermined installation position relative to the rotational axis 7—7 for a selection operation in which the gear knob 15 carries out pivoting motion about the rotational axis 7—7. For this purpose, the first catch 38 on the acceptance part 16 is located in a predetermined position (coinciding with the joint axis 11—11 in the installed position) relative to the axis of the joint eyes in the forkhead 18 for support on the joint pin 19. On the support ring 32, the angular position 35 of the second catch 40 relative to the first positioning element 21 interacting with the first catch 38 is matched to the positional arrangement on the lever part 14 between the second positioning elements 22 and interacts with the second catches 40, relative to the gear knob 15, such that, on engagement of the positioning elements 22, the gear knob 15 necessarily takes up its predetermined installation position. The lever part 14 then naturally exhibits an angular position 36 relative to the acceptance part 16 as specified by the catches.

In accordance with the present invention, the acceptance part 16, together with the support spring 30, the support rings 24 and 32 and the circlip 34, form a preassembled structural unit which is initially installed in the bracket part 27 without the lever part 14 and the gear knob 15. In a subsequent assembly step, the selection gate 17 is placed on the bracket part 27 so that the structural unit mentioned is, generally speaking, covered over.

For the subsequent assembly of a second preassembled structural unit, which consists of the lever part 14 with the gear knob 15 and the positioning elements 22, the upper support ring 32 operating as the holding-down device has corresponding assembly slots 42 for feeding through the positioning elements 22. These assembly slots 42 are arranged offset relative to the second catches 40 by a rotational angle 48.

In this manner, the lever part 14, together with its positioning elements 22, can be inserted in the acceptance part 16 while compressing the support spring 30 and engage in its installed position after rotation through the angle 48. The pre-loading of the support spring 30 is configured such that the support ring 24 is rigidly supported under the normal manual forces of gear selection.

Figure 5:
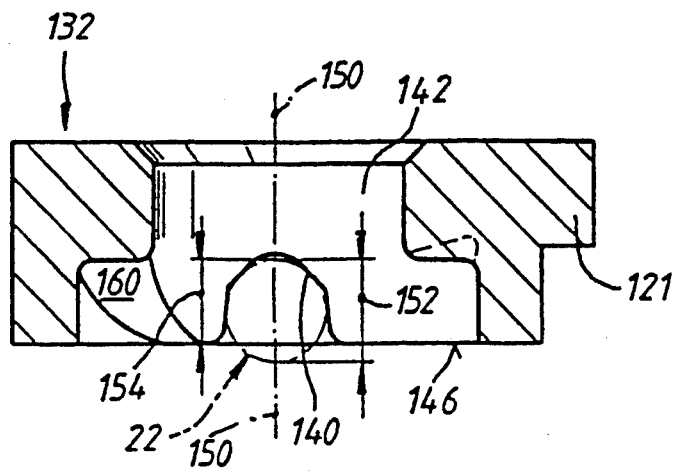
FIG. 5 is a sectional view of another embodiment of a support ring of the device along line V—V of FIG. 6; ad

The embodiment designated generally by the numeral 132 in FIGS. 5 and 6 for the support ring 32 which operates as a holding-down device in FIGS. 2 and 3, provides an additional inclined surface 160 between the assembly slot 142 for feeding through a positioning element 22 and the catch 140 for fixing this positioning element 22. This inclined surface 160 merges via transition 162 into the end face 146 of the support ring 132 with the catch 140 by a rotational difference angle 164 in the peripheral direction before that associated catch 140. Accordingly, the force required for inserting the second pre-assembled structural unit containing the lever part 14 into the installed position (angular position 36 in FIG. 3) is kept small, a positive association between the assembly slot and the catch is achieved and an unintentional change-over of the positioning element 22 from the catch 140 into the region of the inclined surface 160 is avoided.

In order to be able to accommodate the inclined surface 160 from a spatial point of view, the rotational difference angle 148 between the catch 140 and the associated assembly slot 142 is greater than 90°.

In all other respects, the two embodiments of the support ring 32, 132 operating as a holding-down device are similarly configured. Thus, the support ring 132 also has, on its external surface, a lug which can be inserted as the first positioning element 121 in the slot 38, the lug being offset by a certain rotational difference angle 135 (which is equal to the rotational difference angle 35) relative to the axis of the catches 140. Finally, the support ring 132 is sized such that the effective depth 154 of the catches 140 measured in the direction of the ring axis 150—150 is smaller than the diameter 152 of the positioning elements 22 in order that the spring force is introduced into the support ring 132 via the positioning element 22.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for releasably connecting a hand lever via a joint to a setting linkage for selecting gears of a change-speed gearbox, comprising a rod-shaped lever part fixed relative to the hand lever; a sleeve-shaped acceptance part for the lever part; a sliding guide, fixed relative to one half of the joint for the lever part; a support part fixed relative to the lever part; a first supporting ring configured to support the support part fixed relative to the hand lever; a guide for the axial displacement of the supporting ring relative to the acceptance part; an abutment fixed relative to the acceptance part; a spring between the supporting ring and the abutment, a second supporting ring operating as a holding-down device for the support part fixed relative to the hand lever; a releasable stop operatively held on the acceptance part for one of the first and second supporting rings for accepting a force of the spring; means for fixing the lever part in a defined angular position relative to the acceptance part, including a first positioning element fixed relative to one of the supporting rings, a first catch fixed relative to the acceptance part for fixing one of the supporting rings with the first positioning element in the defined angular position, a second positioning element and a corresponding second catch arranged that the lever pat can be fixed relative to the one supporting ring fixed with the first positioning element whenever the lever part is brought into the defined angular position, wherein the supporting rings are moveable relative both to one another and to the lever part, the second supporting ring operating as the holding-down device is provided with both the first positioning element and an assembly slot for feeding through the second positioning element and configured to be fixed relative to the acceptance part in one direction of a support axis via the releasable stop and in an opposite direction of the support axis pointing towards the abutment via a further stop, the second positioning element is fixed relative to the lever part but is movable relative to the supporting rings, the second catch is provided on an end face of the second supporting ring which faces towards the first supporting ring, the second catch is offset relative to the assembly slot by a rotational difference angle, the sliding guide is fixed relative to the acceptance part, the acceptance part is fixed relative to the one half of the joint for the lever part.

2. The device according to claim 1, wherein the second positioning element is configured and operatively arranged to be brought into continuous contact with an adjacent end face of the second supporting ring, a dimension of the second positioning element in the direction of one of a bearing axis and ring axis being greater than an effective depth of the associated second catch.

3. The device according to claim 1, wherein the first catch is a slot open to an end face of the acceptance part having an assembly opening for insertion of at least the supporting rings and is closed in a direction pointing towards the abutment, so that the bottom of the slot forms the further stop for fixing the second supporting ring in the direction pointing towards the abutment.

4. The device according to claim 3, wherein the second positioning element is configured and operatively arranged to be brought into continuous contact with an adjacent end face of the second supporting ring, a dimension of the second positioning element in the direction of one of a bearing axis and ring axis being greater that an effective depth of the associated second catch.

5. The device according to claim 1, wherein the first positioning element is a radial lug-type protrusion on an outer surface of the second supporting ring.

6. The device according to claim 5, wherein the second positioning element is configured and operatively arranged to be brought into continuous contact with an adjacent end face of the second supporting ring, a dimension of the second positioning element in the direction of one of a bearing axis and ring axis being greater than an effective depth of the associated second catch.

7. The device according to claim 6, wherein the first catch is open to an end face of the acceptance part having an assembly opening for insertion of at least the supporting rings and is closed in a direction pointing towards the abutment, so that the bottom of the slot forms the further stop for fixing the second supporting ring in the direction pointing towards the abutment.

8. The device according to claim 1, wherein the assembly slot merges in a peripheral direction via an inclined surface into an end face having the second catch.

9. The device according to claim 8, wherein the second positioning element is configured and operatively arranged to be brought into continuous contact with an adjacent end face of the second supporting ring, a dimension of the second positioning element in the direction of one of a bearing axis and ring axis being greater than an effective depth of the associated second catch.

10. The device according to claim 9, wherein the first catch is a slot open to an end face of the acceptance part having an assembly opening for insertion of at least the supporting rings and is closed in a direction pointing towards the abutment, so that the bottom of the slot forms the further stop for fixing the second supporting ring in the direction pointing towards the abutment.

11. The device according to claim 10, wherein the first positioning element is a radial lug-type protrusion on an other surface of the second supporting ring.

12. The device according to claim 8, wherein a transition between the inclined surface and the end face is offset relative to the second catch by a rotational difference angle.

13. The device according to claim 1, wherein a second half of the joint is fixed relative to a setting shaft, and the joint is a single-axis joint with a axis located transverse to the rotational axis of the setting shaft.

14. The device according to claim 13, wherein the second positioning element is configured and operatively arranged to be brought into continuous contact with an adjacent end face of the second supporting ring, a dimension of the second positioning element in the direction of one of a bearing axis and ring axis being greater than effective depth of the associated second catch.

15. The device according to claim 14, wherein the first catch is a slot open to an end face of the acceptance part having an assembly opening for insertion of at least the support rings and is closed in a direction pointing towards the abutment, so that the bottom of the slot forms the further stop for fixing the second supporting ring in the direction pointing towards the abutment.

16. The device according to claim 15, wherein the first positioning element is a radial lug-type protrusion on an outer surface of the second supporting ring.

17. The device according to claim 16, wherein the assembly slot merges in a peripheral direction via an inclined surface into an end face having the second catch.

18. The device according to claim 17, wherein a transition between the inclined surface and the end face is offset relative to the second catch by a rotational difference angle.

19. The device according to claim 13, wherein the setting shaft is fixed relative to a setting lever.

* * * * *